Figure 1:
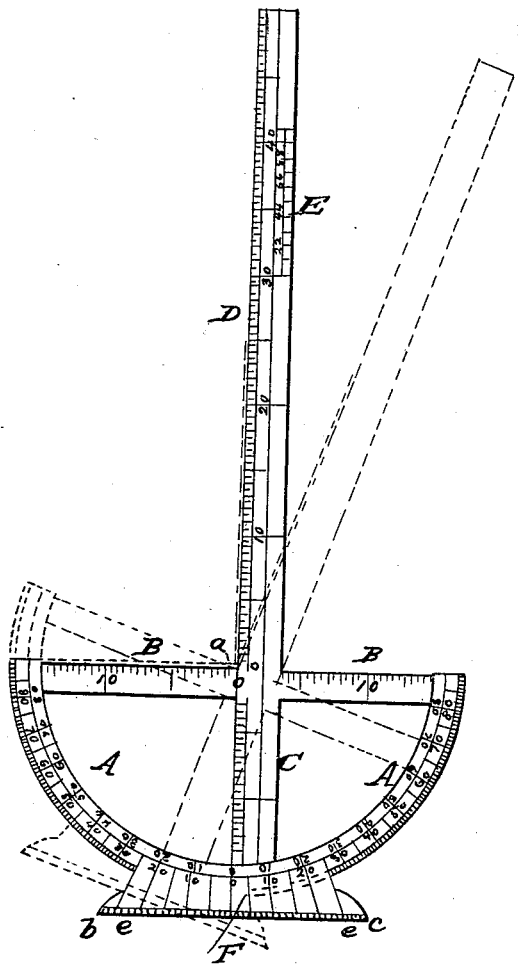

S. BARNETT.
Combined T Square, Protractor, and Rule.

No. 29,133. Patented July 17, 1860.

Witnesses.

Inventor.

UNITED STATES PATENT OFFICE.

SAML. BARNETT, OF WASHINGTON, GEORGIA.

PLOTTING INSTRUMENT.

Specification of Letters Patent No. 29,133, dated July 17, 1860.

*To all whom it may concern:*

Be it known that I, SAMUEL BARNETT, of Washington, in the county of Wilkes and State of Georgia, have invented a new and Improved Surveyor's Rule; and I do hereby declare that the following is a full, clear, and exact description of the same, reference being had to the accompanying drawings, making a part of this specification, in which the figure represents the rule, showing, in red lines, the operation of the same.

This invention is an instrument to be used by surveyors in plotting, for finding the direction or angle, and length of any given line, with a base or meridian line, and also by mechanical or architectural draftsmen in their delineations upon the drawing board.

My invention consists in combining in a very simple way, a protractor, graduated rule, and T-square, in one and the same instrument, by a simple adjustment of which, both the direction and length of any given line can be readily and accurately obtained without calculation, as will be hereinafter described and represented.

To enable those skilled in the art to fully understand my invention, I will proceed to describe its construction and operation.

In the drawings, A represents a protractor, or semicircular plate graduated into degrees, each 1/360 of a circle, with a plate B, subtending the arc that is graduated into twenty degrees on each side of the center from which the arc is described, and perpendicular with the radius plates B, B, and C, is projected a tongue D, which is also graduated into degrees, as clearly shown in the drawings. This tongue or rule and straight edge is placed to one side of the axis $a$, of the protractor, so that its graduated edge will intersect this point $a$, and also zero on the graduated semi-circle or protractor.

E, is a vernier, which will be found very convenient in using the instrument for plotting, and which will need no explanation, as it will be perfectly understood by those familiar with the use of mathematical instruments.

F, is a graduated portion, the edge $b$, $c$, or base of which is perpendicular with the rule D. The graduated lines are all radial from the point $a$. This portion F, serves, in connection with two or more pins $e$, $e$, that project from the graduated side of the instrument at the points indicated, to form a perfect T-square which may be used for all purposes where parallel or meridian lines, and perpendicular lines are required. Instead of pins, a strip, of suitable thickness, will answer the desired purpose, or the edge of portion F, may be turned over at right angles to the surface of the instrument, but the pins $e$, $e$, one in each extreme corner of the portion F, will give the instrument lightness, and will be less expensive than a strip riveted on or turned over.

For an ordinary draftsman's purpose, the rule or tongue need not be graduated, but the divisions of inches into tenths and twentieths on this rule, will be found useful for all purposes where the exact lengths of lines to be drawn are desired.

In making these instruments, they are marked out on a suitable plate, and graduated in a desirable manner. When this is done, they are cut from the plate and finished up for use. The utility of this improved instrument is very obvious. It supersedes, for all ordinary plotting the necessity of a box of instruments, excelling them in simplicity, cheapness, accuracy and facility in using them. The instrument is more easily understood, less liable to injury, and requires fewer manipulations and adjustments, than any instrument for effecting the same purposes, now in use.

It will not be necessary for me to enter into a description of the many instances where this instrument will be found valuable to the surveyor, architect, and draftsman, as the above description, in connection with the drawings, will serve to illustrate the operation of the invention, for all purposes for which it may be used.

Having thus described the construction of my improved instrument, what I claim as new, and desire to secure by Letters-Patent is—

The instrument, constructed essentially as herein described and represented, combining a protractor, graduated rule and T-square, arranged in such a way that the adjustment of the protractor adjusts the rule.

SAM BARNETT.

Witnesses:
DANELL PALMER,
I. F. DENMEAD.